(12) United States Patent
Suragani Venu et al.

(10) Patent No.: US 12,515,378 B2
(45) Date of Patent: Jan. 6, 2026

(54) METHOD OF MAKING ARTICLES FROM RECYCLABLE FABRICS

(71) Applicant: Lubrizol Advanced Materials, Inc., Cleveland, OH (US)

(72) Inventors: Lalith B. Suragani Venu, Brecksville, OH (US); Ravi R. Vedula, North Ridgeville, OH (US); Christopher A. Sprague, Cuyahoga Falls, OH (US); Brandon Walton, Richmond Heights, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 421 days.

(21) Appl. No.: 18/030,554

(22) PCT Filed: Oct. 26, 2021

(86) PCT No.: PCT/US2021/056636
§ 371 (c)(1),
(2) Date: Apr. 6, 2023

(87) PCT Pub. No.: WO2022/093810
PCT Pub. Date: May 5, 2022

(65) Prior Publication Data
US 2023/0382015 A1 Nov. 30, 2023

Related U.S. Application Data

(60) Provisional application No. 63/106,025, filed on Oct. 27, 2020.

(51) Int. Cl.
| | | |
|---|---|---|
| B29B 17/04 | (2006.01) |
| C08G 18/12 | (2006.01) |
| C08G 18/40 | (2006.01) |
| C08G 18/42 | (2006.01) |
| C08G 18/48 | (2006.01) |
| C08G 18/76 | (2006.01) |
| C08J 11/06 | (2006.01) |
| D01F 6/70 | (2006.01) |
| D04B 1/16 | (2006.01) |
| B29K 75/00 | (2006.01) |
| B29L 31/00 | (2006.01) |

(52) U.S. Cl.
CPC .......... *B29B 17/0412* (2013.01); *C08G 18/12* (2013.01); *C08G 18/4018* (2013.01); *C08G 18/4277* (2013.01); *C08G 18/4854* (2013.01); *C08G 18/7671* (2013.01); *C08J 11/06* (2013.01); *D01F 6/70* (2013.01); *D04B 1/16* (2013.01); *B29K 2075/00* (2013.01); *B29L 2031/726* (2013.01); *C08J 2367/00* (2013.01); *C08J 2375/06* (2013.01); *C08J 2375/08* (2013.01); *C08J 2475/06* (2013.01); *C08J 2475/08* (2013.01); *D10B 2331/04* (2013.01); *D10B 2331/10* (2013.01); *D10B 2401/061* (2013.01); *D10B 2401/063* (2013.01)

(58) Field of Classification Search
CPC .................................................. B29B 17/0412
See application file for complete search history.

(56) References Cited

U.S. PATENT DOCUMENTS

| | | | |
|---|---|---|---|
| 11,008,418 B2 | 5/2021 | Rukavina | |
| 2004/0266301 A1* | 12/2004 | Vedula | C08G 18/4808 528/60 |
| 2015/0275402 A1 | 10/2015 | Vedula et al. | |
| 2020/0305526 A1 | 10/2020 | Gantz et al. | |

FOREIGN PATENT DOCUMENTS

| | | |
|---|---|---|
| CN | 102504182 A | 6/2012 |
| WO | 2019/175151 A1 | 9/2019 |
| WO | WO2019215104 A1 | 11/2019 |

* cited by examiner

*Primary Examiner* — Timothy Kennedy
(74) *Attorney, Agent, or Firm* — Vincent A. Cortese; Michael A. Miller

(57) ABSTRACT

The invention relates to a method of making an article by recycling a disperse dyed fabric. The fabric is made from a melt-spun thermoplastic polyurethane fiber which contains a co-polymer diol derived from caprolactone monomer and a polyether polyol. The fabric is shredded and then thermally treated to form granules, which can be melted in an extruder to form an article.

23 Claims, No Drawings

METHOD OF MAKING ARTICLES FROM RECYCLABLE FABRICS

This application is a national-phase filing of PCT Application No. PCT/US2021/056636, filed on Oct. 26, 2021, which claims the benefit of U.S. Provisional Application No. 63/106,025, filed on Oct. 27, 2020.

BACKGROUND OF THE INVENTION

In the apparel market, there is increasing interest in fabrics that can stretch, but maintain shape and fit. Thermoplastic polyurethane ("TPU") fibers show great potential for providing the stretch and fit properties but have some drawbacks. Many polyurethane fibers are made by dry spinning processes that involve dissolving the reactive ingredients in solvent. Such fibers generally have good heat resistance, but the dry spinning process is expensive, time consuming, and involves the use of volatile solvents creating environmental concerns. Melt-spinning of fibers has manufacturing advantages, but not all TPU is amenable to forming a fiber under melt-spinning conditions. In addition, prior art TPUs that can be melt-spun into fibers do not have the heat resistance to allow them to withstand certain dyeing conditions. This makes it difficult to combine the melt-spun TPU fibers with other common synthetic or natural fibers, because the TPU fibers may lose their stretch and recovery properties after exposure to the dyeing conditions.

Thus, it would be desirable to have a melt-spun TPU fiber that has good stretch and recovery properties, but that can be dyed under disperse dyeing conditions (e.g. at temperatures around 130°-135° C.). It would also be desirable to have a fabric made from TPU fibers alone or in combination with other fiber materials in order to provide a fabric that can be dyed and have desirable properties.

In addition, the recycling of scrap or used fabrics is an area of increasing interest. It would be desirable to have a method of recycling fabric materials in order to make other articles.

SUMMARY OF THE INVENTION

In one embodiment, the present invention is a melt-spun fiber, wherein fiber comprises a thermoplastic polyurethane composition and an isocyanate functional cross-linking agent. The thermoplastic polyurethane composition used in the fiber comprises the reaction product of (i) a polyol component which comprises or consists of a copolymer diol derived from caprolactone monomer and poly(tetramethylene ether glycol), (ii) a hydroxyl terminated chain extender component, and (iii) a first diisocyanate component.

In another embodiment, the invention comprises a process for preparing a thermoplastic polyurethane having the following steps: (a) preparing a reactive thermoplastic polyurethane composition that is the reaction product of (a) a polyol component, wherein the polyol component comprises a co-polymer diol derived from caprolactone monomer and poly(tetramethylene ether glycol), (b) a chain extender component comprising 1,4-bis(β-hydroxyethoxy)benzene; and (c) a diisocyanate; (2) drying the reactive thermoplastic polyurethane composition; (3) melting the reactive thermoplastic polyurethane composition in an extruder; (4) adding an isocyanate functional prepolymer into the extruder; (5) mixing the reactive thermoplastic polyurethane composition and the isocyanate functional prepolymer in the extruder to form a crosslinked thermoplastic polyurethane polymer; (6) feeding the crosslinked thermoplastic polyurethane polymer to at least one spinneret to produce a melt-spun fiber; (7) cooling the melt-spun fiber; and (8) winding the melt-spun fiber onto a bobbin.

In still another embodiment, the invention provides a fabric, which comprises a first a fiber component, comprising a hard yarn having 10% to 75% ultimate elongation measured according to ASTM D2256, for example a polyester fiber, and a second fiber component comprising a melt-spun thermoplastic polyurethane filament having at least 300% ultimate elongation measured according to ASTM D2731, wherein the first fiber component and the second fiber component are knitted together to form the fabric and wherein the fabric is dyed using disperse dyeing conditions.

In another embodiment, the invention provides a method of recycling the fabrics made herein to make other articles.

These various embodiments are described in more detail below.

DETAILED DESCRIPTION OF THE INVENTION

The features and embodiments of the present invention will be described below by way of the following non-limiting illustration.

The disclosed technology includes a melt-spun fiber comprising a thermoplastic polyurethane ("TPU") composition and an isocyanate functional cross-linking agent. The TPU composition useful in making the melt-spun fiber of the present invention is the reaction product of a polyol component, a hydroxyl terminated chain extender component, and a diisocyanate component. The isocyanate functional crosslinking agent is the reaction product of a polyol with an excess of isocyanate. Each of these components will be described in more detail below.

As used herein, weight average molecular weight (Mw) is measured by gel permeation chromatography using polystyrene standards and number average molecular weight (Mn) is measured by end group analysis.

Thermoplastic Polyurethane Composition

The TPU compositions useful in making the melt-spun fiber of the present invention include a polyol component, which may also be described as a hydroxyl terminated intermediate. In the present invention, the polyol component comprises or consists of a co-polymer diol derived from caprolactone monomer and a hydroxyl functional polyether intermediate.

Caprolactone monomers useful in making the co-polymer polyol for use in the present invention include ε-caprolactone and 2-oxepanone. In one embodiment, the caprolactone monomer is reacted with a polyether diol to form the copolymer diol. In another embodiment, the ε-caprolactone may be reacted with another bifunctional initiator such as diethylene glycol, 1,4-butanediol, neopentyl glycol or any of the other glycols and/or diols known to those skilled in the art.

In an embodiment, where the ε-caprolactone is reacted with a polyether polyol intermediate, suitable hydroxyl functional polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus may be preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. In some embodiments, the hydroxyl functional polyether intermediate used in the present invention comprises or consists of PTMEG.

In one embodiment, the polyol component comprises or consists of a copolymer diol that is the reaction product of a caprolactone monomer and poly(tetramethylene ether glycol). In another embodiment, the polyol component comprises or consist of the reaction product of about 50% by weight ε-caprolactone monomer and about 50% by weight poly(tetramethylene ether glycol).

In one embodiment of the invention, the reaction mixture to form the TPU composition used herein includes about 50% by weight to about 80% by weight of the polyol component, for example, about 60% by weight to about 75% by weight, or even about 65% by weight to about 70% by weight.

The Chain Extender Component

The TPU compositions described herein are made using a chain extender component. Suitable chain extenders include diols, diamines, and combination thereof.

Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy) phenyl] propane (HEPP), 1,4-bis(β-hydroxyethoxy)benzene (HQEE), hexamethylenediol, heptanediol, nonanediol, dodecanediol, 3-methyl-1,5-pentanediol, ethylenedi amine, butanediamine, hexamethylenediamine, and hydroxyethyl resorcinol (HER), and the like, as well as mixtures thereof. In one embodiment, the chain extender comprises or consists of 1,4-bis(β-hydroxyethoxy)benzene (HQEE).

In one embodiment of the invention, the reaction mixture to form the TPU composition used herein includes about 5% by weight to about 25% by weight of the chain extender component, for example, about 5% by weight to about 15% by weight, or even about 8% to about 10%.

The Isocyanate Component

The TPU of the present invention is made using isocyanate component. The isocyanate component may comprise one or more polyisocyanates, or more particularly, one or more diisocyanates. Suitable polyisocyanates include aromatic diisocyanates, aliphatic diisocyanates, or combinations thereof. In some embodiments, the polyisocyanate component includes one or more aromatic diisocyanates. In some embodiments, the polyisocyanate component is essentially free of, or even completely free of, aliphatic diisocyanates. In other embodiments, the polyisocyanate component includes one or more aliphatic diisocyanates. In some embodiments, the polyisocyanate component is essentially free of, or even completely free of, aromatic diisocyanates. In some embodiments, mixtures of aliphatic and aromatic diisocyanates may be useful.

Examples of useful polyisocyanates include aromatic diisocyanates such as 4,4'-methylenebis(phenyl isocyanate) (MDI), 3,3'-dimethyl-4,4'-biphenylene diisocyanate (TODI), 1,5-naphthalene diisocyanate (NDI), m-xylene diisocyanate (XDI), phenylene-1,4-diisocyanate, naphthalene-1,5-diisocyanate, and toluene diisocyanate (TDI); as well as aliphatic diisocyanates such as 1,6-hexamethylene diisocyanate (HDI), isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), and dicyclohexylmethane-4,4'-diisocyanate (H12MDI). Isomers of these diisocyanates may also be useful. Mixtures of two or more polyisocyanates may be used. In some embodiments, the isocyanate component comprises or consists of an aromatic diisocyanate. In some embodiments, the isocyanate component comprises or consists of MDI.

In one embodiment of the invention, the reaction mixture to form the TPU composition used herein includes about 15% by weight to about 30% by weight of the isocyanate component, for example, about 15% by weight to about 25% by weight, or even about 18% by weight to about 20% by weight.

Optionally, one or more polymerization catalysts may be present during the polymerization reaction of the TPU. Generally, any conventional catalyst can be utilized to react the diisocyanate with the polyol intermediates or the chain extender. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organometallic compounds, such as titanic esters, iron compounds, e.g. ferric acetylacetonate, tin compounds, e.g. stannous diacetate, stannous octoate, stannous dilaurate, bismuth compounds, e.g. bismuth trineodecanoate, or the dialkyltin salts of aliphatic carboxylic acids, e.g. dibutyltin diacetate, dibutyltin dilaurate, or the like. The amounts usually used of the catalysts are from 0.001 to 0.1 part by weight per 100 parts by weight of polyol component. In some embodiments, the reaction to form the TPU of the present invention is substantially free of or completely free of catalyst.

TPU compositions used in the present invention may be made via a "one shot" process wherein all the components are added together simultaneously or substantially simultaneously to a heated extruder and reacted to form the TPU. The equivalent ratio of the diisocyanate to the total equivalents of hydroxyl terminated intermediate and the chain extender is generally from about 0.95 to about 1.10, for example about 0.97 to about 1.03, or even about 0.98 to about 1.0. In one embodiment, the equivalent ratio may be less than 1.0 such that the TPU has terminal hydroxyl groups to enhance the reaction with the crosslinking agent during the fiber spinning process. The weight average molecular weight (MW) of the TPU is generally from about 25,000 to about 300,000, for example from about 50,000 to about 200,000, even further for example about 75,000 to about 150,000.

In another embodiment, the TPU may be prepared using a pre-polymer process. In the pre-polymer process, the hydroxyl terminated intermediate is reacted with generally an equivalent excess of one or more diisocyanates to form a pre-polymer solution having free or unreacted isocyanate therein. Subsequently, a chain extender, as described herein, is added in an equivalent amount generally equal to the isocyanate end groups as well as to any free or unreacted diisocyanate compounds. The overall equivalent ratio of the total diisocyanate to the total equivalent of hydroxyl terminated intermediate and chain extender is thus from about 0.95 to about 1.10, for example about 0.97 to about 1.03, or even about 0.98 to about 1.0. In one embodiment, the equivalent ratio may be less than 1.0 such that the TPU has terminal hydroxyl groups to enhance the reaction with the crosslinking agent during the fiber spinning process. Typically, the prepolymer process can be carried out in any conventional device, such as an extruder.

Optional additive components may be present during the polymerization reaction, and/or incorporated into the TPU elastomer described above to improve processing and other properties. These additives include but are not limited to antioxidants, organic phosphites, phosphines and phosphonites, hindered amines, organic amines, organo sulfur compounds, lactones and hydroxylamine compounds, biocides, fungicides, antimicrobial agents, compatibilizers, electrodissipative or anti-static additives, fillers and reinforcing agents, such as titanium dixide, alumina, clay and carbon black, flame retardants, such as phosphates, halogenated materials, and metal salts of alkyl benzenesulfonates, impact modifiers, such as methacrylate-butadienestyrene ("MBS") and methylmethacrylate butylacrylate ("MBA"), mold release agents such as waxes, fats and oils, pigments and colorants, plasticizers, polymers, rheology modifiers such as monoamines, polyamide waxes, silicones, and polysiloxanes, slip additives, such as paraffinic waxes, hydrocarbon polyolefins and/or fluorinated polyolefins, and UV stabilizers, which may be of the hindered amine light stabilizers (HALS) and/or UV light absorber (UVA) types. Other additives may be used to enhance the performance of the TPU compostions or blended product. All of the additives described above may be used in an effective amount customary for these substances.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

The Isocyanate Functional Crosslinking Agent

The TPU composition described above is combined with an isocyanate functional crosslinking agent. The crosslinking agent is the reaction product of a hydroxyl terminated polyol selected from polyether, polyester, polycaprolactone, polycarbonate, and mixtures thereof, with an excess of diisocyanate. In one embodiment, the hydroxyl terminated polyol used in the crosslinking agent is a polyether polyol. For example, the hydroxyl terminated polyether may comprise or consist of poly(tetramethylene ether glycol). In another embodiment, the hydroxyl terminated polyol used in the crosslinking agent is a polyester. For example, the hydroxyl terminated polyester may comprise or consist of neopentyl glycol adipate. In one embodiment, the polyisocyanate component is an aromatic diisocyanate, for example, MDI. In another embodiment, the polyisocyanate component is an aliphatic diisocyanate, for example H12MDI. The crosslinking agent has an isocyanate functionality greater than 1.0, for example, from about 1.5 to 2.5, further for example about 1.8 to 2.2. The isocyanate functional crosslinking agent may be prepared using the prepolymer process as described herein where a hydroxyl terminated intermediate is reacted with an equivalent excess of one or more diisocyanates to form a pre-polymer solution having free or unreacted isocyanate.

The weight percent of crosslinking agent used with the TPU polymer is from about 5.0% by weight to about 20% by weight, for example about 8.0% by weight to about 15% by weight. The percentage of crosslinking agent used is a weight percent based on the total weight of TPU and crosslinking agent.

Thermoplastic Polyurethane Fibers

Melt-spun TPU fibers are made by melting the TPU composition in an extruder and adding the crosslinking agent to the melted TPU. The TPU melt with the crosslinking agent is fed to a spinneret. The melt exits the spinneret to form the fibers and the fibers are cooled and wound onto bobbins. The process includes the following steps: (1) preparing a reactive thermoplastic polyurethane composition that is the reaction product of (a) a polyol component, wherein the polyol component comprises or consists of a co-polymer diol derived from caprolactone monomer and poly(tetramethylene ether glycol), (b) a chain extender component comprising or consisting of 1,4-bis(β-hydroxyethoxy)benzene; and (c) a diisocyanate; (2) drying the reactive thermoplastic polyurethane composition; (3) melting the reactive thermoplastic polyurethane composition in an extruder; (4) adding an isocyanate functional prepolymer into the extruder; (5) mixing the reactive thermoplastic polyurethane composition and the isocyanate functional prepolymer in the extruder to form a crosslinked thermoplastic polyurethane polymer; (6) feeding the crosslinked thermoplastic polyurethane polymer to at least one spinneret to produce a melt-spun fiber; (7) cooling the melt-spun fiber; and (8. winding the melt-spun fiber onto a bobbin core. The steps of this process will be described in more detail below.

The melt-spinning process begins with feeding a preformed TPU polymer, into an extruder. The TPU is melted in the extruder and the crosslinking agent is added continuously downstream near the point where the TPU melt exits the extruder or after the TPU melt exits the extruder. If the crosslinking agent is added after the melt exits the extruder, the crosslinking agent needs to be mixed with the TPU melt using static or dynamic mixers to assure proper combining of the crosslinking agent into the TPU polymer melt. After exiting the extruder and mixer, the melted TPU polymer with crosslinking agent flows into a manifold. The manifold divides the melt stream into different streams, where each stream is fed to a plurality of spinnerets. Usually, there is a melt pump for each different stream flowing from the manifold, with each melt pump feeding several spinnerets. The spinneret will have a small hole through which the melt is forced and exits the spinneret in the form of a fiber. The size of the hole in the spinneret will depend on the desired size (denier) of the fiber. The fiber is drawn or stretched as it leaves the spinneret and is cooled before winding onto bobbins. The fibers are stretched by winding the bobbins at a higher speed than that of the fiber exiting the spinneret. For the melt-spun TPU fibers, the bobbins are usually wound at a rate that is greater than the speed of the fiber existing the spinneret, for example, in some embodiments, of 4 to 8 times the speed of the fiber exiting the spinneret, but can be wound slower or faster depending on the particular equipment. Typical bobbin winding speeds can vary from 100 to 3000 meters per minute, but more typical speeds are 300 to 1200 meters per minute for TPU melt-spun fibers. Finish oils, such as silicone oils, are usually added to the surface of the fibers after cooling and just prior to being wound into bobbins.

An important aspect of the melt spinning process is the mixing of the TPU polymer melt with the crosslinking agent. Proper uniform mixing is important to achieve uniform fiber properties and to achieve long run times without experiencing fiber breakage. The mixing of the TPU melt and crosslinking agent should be a method which achieves plug-flow, i.e., first in first out. The proper mixing can be achieved with a dynamic mixer or a static mixer. For example, a dynamic mixer which has a feed screw and mixing pins may be used. U.S. Pat. No. 6,709,147 describes such a mixer and has mixing pins which can rotate.

The TPU is reacted with the crosslinking agent during the fiber spinning process to give a weight average molecular weight (MW) of the TPU in fiber form of from about 200,000 to about 800,000, preferably from about 250,000 to about 500,000, more preferably from about 300,000 to about 450,000. The reaction in the fiber spinning process between the TPU and the crosslinking agent at the point where the TPU exits the spinneret should be above 20%, preferably from about 30% to about 60%, and more preferably from about 40% to about 50%. Typical prior art TPU melt spinning reaction between the TPU polymer and the crosslinking agent is less than 20% and usually about 10-15% reaction. The reaction is determined by the disappearance of the NCO groups. The higher % reaction of this invention improves melt strength thus allowing a higher spinning temperature which improves the spinnability of the TPU. The fibers are normally aged in an oven on the bobbins until the molecular weight plateaus.

The spinning temperature (the temperature of the polymer melt in the spinneret) should be higher than the melting point of the polymer, and preferably from about 10° C. to about 20° C. above the melting point of the polymer. The higher the spinning temperature one can use, the better the spinning. However, if the spinning temperature is too high, the polymer can degrade. Therefore, from about 10° C. to about 20° C. above the melting point of the TPU polymer, is the optimum for achieving a balance of good spinning without degradation of the polymer. If the spinning temperature is too low, polymer can solidify in the spinneret and cause fiber breakage. The spinning temperature for the fibers produced by this invention is greater than 190° C. and preferably from about 190° C. to about 220° C., or even about 190° C. to about 200° C.

An important aspect of making melt-spun TPU fibers is the time one can run the process continuously without stopping. The necessity to stop the process is usually a result-of fiber breaking. Fiber breaking—occurs when—the pressure at the spinneret increases to an unacceptable level. When the pressure reaches about 140 to 200 kg force per square cm., fiber breakage will usually occur. Pressure buildup can occur for several reasons such as improper mixing. This leads to formation of products due to self reaction of the crosslinking agent which may cause partial blockage of the small exit hole in the spinneret for the fiber. The present invention allows for much longer run times before exceeding harmful pressure build-up resulting in fiber breakage.

Melt-spun TPU fibers can be made in a variety of denier. The term "denier" is defined as the mass in grams of 9000 meters of fiber, filament, or yarn. It is describing linear density, mass per unit length of fibers, filaments, or yarns and is measured according to ASTM D1577, Option B. Typical melt-spun TPU fibers are made in a denier size less than 240, more typical from 10 to less than 240 denier size, with 20 and 40 denier being a popular size.

Prior art melt-spun TPU fibers are not normally used in combination with polyester fibers because of the high temperature, required to dye polyester. Due to the lack of polarity and the extremely crystalline nature of polyester polymer and fibers dispersive dyes are typically used for dyeing. Such fibers are normally dyed at 120° C. to 135° C., for example, around 130° C. for 60 minutes and pressures of 1 to 1.5 kg/cm². This pressure dyeing "opens" up the polyester polymer, enabling the dye molecule to penetrate. When the dyeing is complete and fabric is removed from the pressure dyeing vessel (referred as dyeing machine), the polyester polymer system "closes" again, "trapping" the disperse dye molecule inside. Prior art melt-spun TPU fibers cannot withstand this type of temperature for 60 minutes without losing their physical properties such as tenacity and percent set both measured according to ASTM D2731. In addition, prior art melt-spun TPU fibers also tend to fuse to neighboring fibers when exposed to aforementioned elevated temperatures and pressures, which is detrimental to the stretch properties of the fabric.

The high heat resistance of the melt-spun TPU fibers of this invention can withstand the dyeing operation for polyester fibers, while retaining sufficient physical properties to remain elastic.

Another feature of the high heat resistant melt-spun TPU fibers of this invention is their ability to pick up dispersive dyes. The process for dispersive dyeing involves exposure to temperatures of about 130° C. for about 60 minutes (dyeing conditions for polyester fibers). Many TPU fibers are not able to show dye pickup, color fastness (after washing) and bleach resistance after exposure to these temperatures.

The melt-spun fibers made in accordance with the present invention have unique physical properties not exhibited by prior art TPU fibers. First, the fibers exhibit unique elasticity properties. For example, fibers made in accordance with the present invention exhibit hysteresis after 5th load and un-load cycle of less than 30% or even less than 20% at 100% elongation; less than 30% or even less than 18% at 150% elongation; and less than 30% or even less than 18% at 200% elongation. The term "hysteresis" is defined as residual physical effect after an external stimulus is removed, in fibers it is observed as change in dimension after stretching and recovering. Represented as percent hysteresis at corresponding elongation (or strain). Hysteresis is measured according to per ASTM D2731. Calculation of hysteresis may be calculated by using the following information and equation:

Modulus at 100% elongation during load cycle=m1
Modulus at 100% elongation during unload cycle=m2%

$$\text{Hysteresis at 100\% elongation} = (m1-m2)/m1 \times 100.$$
Hysteresis may be similarly calculated at 150% and 200% elongation.

Melt-spun TPU fibers made in accordance with the present invention also have an ultimate elongation of at least 300%, for example 300% to 650% as measured by ASTM D2731. Typically, elastic materials are characterized by extensibility and elasticity: upon release of external force, these materials return almost completely to the original dimensions. For an ideal elastic material, on a stress-strain plot there is only one curve tracing loading and un-loading cycles. However, for most materials, due to loss in energy (in the form of heat), most materials show different curves for loading and unloading, also known as "hysteresis." Lower hysteresis % values imply superior elasticity. Use of an elastic fiber with very low hysteresis % can be used to achieve fabrics with less deformation in garments.

In addition, the melt-spun TPU fibers made in accordance with the present invention may also have melt on-set of 140°-170° C., for example, 150° C. to 170° C. further for example, about 155° C. to 166° C., measured according to ASTM D3418 and elastic modulus of 3.5E+05 to 12E+05 Pa, at 130° C. measured by per DMA (Dynamic mechanical analysis). DMA measurements are conducted using parallel plate configuration from −100° C. to 250° C. with 2° C./min heating rate at 0.1% strain using 1 Hz frequency.

Fabrics

The TPU fibers of the present invention may be used alone or combined with natural or synthetic other fibers by knitting or weaving fibers to make fabrics which can be used in a variety of articles. It is desirable to dye such fabrics in various colors.

In one embodiment, the melt-spun TPU fiber of the present invention may be woven to make a fabric. In another embodiment, the melt-spun TPU fiber of the present invention may be combined with one or more different TPU fibers to make a fabric. In still another embodiment, the melt-spun TPU fibers of this invention may be combined with other fibers, such as cotton, nylon or polyester to make various end use articles, including clothing garments.

For example, a fabric in accordance with the present invention may combine the melt-spun TPU fiber of the present invention with a yarn that is less elastic than the TPU fibers of the present invention, also referred to herein as a "hard yarn." Hard yarns may include, for example, polyester, nylon, cotton, wool, acrylic, polypropylene, or viscose-rayon. Hard yarns may also include, for example, other TPU fibers (not of the present invention) that are less elastic than the TPU fibers of the present invention. In one embodiment, the hard yarn has ultimate elongation 10%-200%, for example, 10% to 75%, or 10% to 60%, or even 10% to 50%, or even 10% to 30% and the melt-spun TPU fiber of the present invention has at least 300% ultimate elongation, for example 300% to 650% ultimate elongation. Each of the fiber components may be included in amounts of 1-99% by weight in the composition. The weight % of the melt-spun TPU fibers in the end use application can vary depending on the desired elasticity. For example, woven fabrics have from 1-8 wt. %, underwear from 2-5 wt. % bathing suits and sportswear from 8-30 wt. % foundation garments from 10-45 wt. %, and medical hose from 35-60 wt. % of the melt-spun TPU fibers with the remaining amount being a hard, non-elastic fiber. The fabrics made with these two fiber materials can be constructed by various processes including but not limited to circular knitting, warp knitting, weaving, braiding, nonwovens or combination thereof. In one embodiment, fabrics made of the fibers of the present invention will have a stretch of more than 100% measured by ASTM D4964. The fibers may be dyed at elevated temperatures of at least 130° C.

Recycling Fabrics

The present invention also includes methods of making articles through recycling of the fabrics disclosed herein. In this method, the disperse dyed fabrics made from the thermoplastic polyurethane fibers described herein can be shredded and then thermally treated to form granules. The thermal treatment process for forming granules would be understood to those skilled in the art. The granules can then be melted and shearing the granules in an extruder to form an article as is generally understood in the art.

Fabrics that can be recycled in the present invention include those made from the melt-spun thermoplastic polyurethane fiber made herein. Such fabrics may also comprise other fibers, including fibers of polyester, nylon, acrylic, polypropylene, or mixtures thereof. In one embodiment, the fabric will contain up to 70% polyester fibers in addition to the melt-spun thermoplastic polyurethane fibers.

In another embodiment, a second polymer material may be added to the extruder along with the granules made from the recycled fabric. Examples of second polymers that may be used include polyesters or other thermoplastic polyurethanes, or mixtures thereof.

In this application and in the following examples, the following properties are referred to along with the methods for measuring such properties:

Denier is the measure of linear density and is measured as per ASTM D1577, Option B;

The tenacity of elastic filaments which is tensile strength normalized by denier was also measured and reported per ASTM D2731;

The ultimate elongation of elastic filaments which is elongation at break was also measured and reported per ASTM D2731;

Hysteresis as defined and calculated as mentioned previously herein at respective elongations and reported per ASTM D2731 for elastic filaments;

For hard yarns like polyester which are in-elastic, tenacity and elongation were measured and ASTM D2256 standard was used;

The content of individual components in fabric was measured as per ASTM D629

Extent of fabric stretch, and fabric modulus were measured as per ASTM D4964.

Fabric laundering was carried out as per American Association of Textile Chemists and Colorists ("AATCC") Test Method 135

The invention will be better understood by reference to the following examples.

EXAMPLES

Table 1 lists TPU compositions prepared used to make fibers in the present invention. The TPU hard segment is the total amount by weight of the isocyanate and chain extender in the TPU composition.

TABLE 1

| Ex. | Polyol | Isocyanate | Chain Extender | Hard Segment (%) | TPU MW (Daltons) |
|---|---|---|---|---|---|
| A | Copolymer of 50 wt % 1000Mn PTMEG and 50 wt % 1000Mn ε-caprolactone | MDI | HQEE | 27 | 125,000 |
| B | 3000 Mn ε-Caprolactone | MDI | 95 wt. % by weight HQEE/ 5% by weight DPG | 31 | 130,000 |

TABLE 1-continued

| Ex. | Polyol | Isocyanate | Chain Extender | Hard Segment (%) | TPU MW (Daltons) |
|---|---|---|---|---|---|
| C | Mixture of 85% 2000Mn PTMEG and 15% of 1000Mn PTMEG | MDI | 80 wt % HQEE/ 20 wt % HER | 29 | 150,000 |
| D | 2000 Mn PTMEG | MDI | HQEE | 24 | 450,000 |
| Ex. TPU Mixture | | | | | |
| E | Physical mixture of 50% Ex. B + 50% Ex. D | | | | |
| F | Physical mixture of 25% Ex. B + 75% Ex. D | | | | |
| G | Physical mixture of 75% Ex. B + 25% Ex. D | | | | |

The TPU polymers of Examples A-G were pre-dried in a vacuum batch dryer at 80° C. for 12 hours. After drying the TPU polymer was melted in a 1.25-inch single screw extruder with an L/D ratio of 24. The extruder had four heating zones that were maintained between 180° C. and 225° C. throughout the process. On exiting the extruder, the TPU polymer melt was mixed with 10 wt % of a prepolymer crosslinking agent (90 wt % TPU polymer melt/10 wt % crosslinker). The TPU and crosslinker combinations are summarized in Table 2.

TABLE 2

| Fiber Example | TPU Example | Crosslinker |
|---|---|---|
| 1 | A | PTMEG + MDI prepolymer, available isocyanate 6.6% |
| 2 | B | PTMEG + MDI prepolymer, available isocyanate 6.6% |
| 3 | C | PTMEG + MDI prepolymer, available isocyanate 6.6% |
| 4 | D | NPG Adipate + MDI prepolymer, available isocyanate 6.6% |
| 5 | E | PTMEG + MDI prepolymer, available isocyanate 6.6% |
| 6 | F | PTMEG + MDI prepolymer, available isocyanate 6.6% |
| 7 | G | PTMEG + MDI prepolymer, available isocyanate 6.6% |
| 8 | A | PTMEG_H12MDI, available isocyanate 6.3% |
| 9 | A | NPG(90%) + HDO(10%) adipate + H12MDI, available isocyanate 6.4% |

The crosslinking agent was mixed with the TPU polymer melt in a dynamic mixer and then pumped through a manifold to spinnerets. Each spinneret had an orifice size of 0.65 mm. The polymer stream emanating the spinneret was cooled by air, a silicon finish oil applied, and the fiber formed was wound into a bobbin. The fiber on the bobbins were heat aged at 80° C. for 24 hours before testing the physical properties of the fibers. Table 3 summarizes the key properties of the fibers.

The fibers of Example 1 were used for making single jersey knitted fabrics on Vanguard circular knitting machine. Multi-filament textured polyester yarns of 70D (68 filaments) were combined (as hard yarns) with examples in Table 3. Knitting tension on the machine was adjusted to knit a balanced ratio in entire fabric to contain 25% of elastomeric yarn in Table 3 and 75% of polyester yarn (This was confirmed by mechanical separation of elastomeric and hard yarns by weight in a swatch of fabric per ASTM D629-15). Fiber Example 1 from Table 2 was successful in converting into a fabric. Fiber Examples 2-7 were too tacky and consistently breaking during knitting process and were not able to be converted into fabrics.

The knitted fabric using fibers of Example 1 was dyed as described below

Scouring, Dyeing and Reduction Clear Solutions: 1000 ml Scouring Solution contained 2 grams $Na_2CO_3$, 6 grams NaOH, with the balance de-ionized water. 1000 ml Dye Solution contained 2 grams Foron Navy S-2GRL 200 from

TABLE 3

| | Break Load | Ultimate Elongation | Hysteresis (%) | | | | | | |
|---|---|---|---|---|---|---|---|---|---|
| | | | 1st Cycle at Elongations | | | 5th Cycle at Elongations | | | |
| Example | gf/d | % | 100% | 150% | 200% | 100% | 150% | 200% | % Set |
| 1 | 1.62 | 530 | 83 | 81 | 79 | 20 | 18 | 22 | 21 |
| 2 | 1.65 | 494 | 93 | 91 | 93 | 65 | 60 | 55 | 44 |
| 3 | 1.49 | 508 | 86 | 89 | 89 | 27 | 39 | 35 | 28 |
| 4 | 1.33 | 544 | 84 | 86 | 85 | 23 | 32 | 38 | |
| 5 | 1.38 | 451 | 89 | 90 | 91 | 30 | 37 | 41 | 29 |
| 6 | 1.32 | 522 | 81 | 83 | 82 | 26 | 35 | 37 | 27 |
| 7 | | | Couldn't spin | | | | | | NA |
| 8 | 1.27 | 591 | 85 | 84 | 82 | 27 | 23 | 27 | 23 |
| 9 | 1.37 | 582 | 77 | 76 | 72 | 21 | 18 | 21 | 21 |

Archroma U.S., 6 grams of $Na_2CO_3$, with the balance deionized water. The pH of the dye bath was adjusted to 4.5 by using acetic acid. 1000 ml of Reduction Clear Solution contained 6 grams of NaOH with the balance de-ionized water.

A piece of fabric of 10 meters long and weighing 1 kg was placed in a Thies miniMaster® dyeing machine. The dyeing machine was programmed for scouring, dyeing, and reduction clear temperature cycles.

Scouring was done using one liter of the Scour Solution prepared above at 65° C. for 30 minutes followed by rinse with a warm tap water. Then the dye vessel was filled with the one liter of Dye Solution The dyeing process was started at 50° C. the bath temperature was then raised slowly at a rate of 2° C./min to 130° C. and held at that temperature for 60 minutes. The temperature was then lowered to 80° C., and then the Dye Solution was drained out of the dye vessel followed by two cycles of tap water rinsing.

Following rinsing, one liter of the Reductive Clear solution prepared above was introduced into dyeing vessel at 75°–80° C. for 30 minutes. Then, the fabric samples were rinsed with warm tap water until there were no further dyes bleeding. Finally, the fabrics were soaked for 30 seconds in a 1% acetic acid neutralizing solution.

The wet fabric samples were air-dried over-night. Once dried, fabric was heat-set in a tenter frame and the fabric was pre-stretched 20% greater than the initial width. Two passes through the tenter frame were followed for this fabric.

Next, the fabric sample was laundered using the American Association of Textile Chemists and Colorists ("AATCC") Test Method 135-2018. Following laundering, the fabric samples were evaluated for stretch properties according to

TABLE 4

| Fabric Stress (10 lb-f)* | Fabric Direction | 50% stretch | 100% stretch | 150% stretch | 200% stretch | % Stretch at Maximum Force (10 lbs.) |
|---|---|---|---|---|---|---|
| Before Wash | Length | 1.3 | 3.3 | 6.4 | — | 175% |
| | Width | 0.8 | 2.0 | 3.6 | 6.7 | 230% |
| After 25 Wash Cycles | Length | 1.3 | 3.2 | 6.0 | — | 181% |
| | Width | 0.9 | 2.3 | 4.1 | 8.0 | 217% |

*According to ASTM D4964 at a constant load of 10 lb-f in both warp (fabric length) and weft (fabric width) directions.

Fabrics made using the fibers of the present invention may also be recycled. In one embodiment, fabrics made in accordance with the present invention are recycled to make extruded or molded articles. Thus, the present invention provides a method of making an article which comprises providing a disperse dyed fabric prepared in accordance with the present invention, shredding such fabric, thermally treating such shredded fabric to form granules, and then melting and shearing the granules in an extruder to form an article.

Each of the documents referred to above is incorporated herein by reference, including any prior applications, whether or not specifically listed above, from which priority is claimed. The mention of any document is not an admission that such document qualifies as prior art or constitutes general knowledge of the skilled person in any jurisdiction. Except in the Examples, or whether otherwise explicitly indicated, all numerical quantities in this description specifying amounts of materials, reaction conditions, molecular weights, number of carbon atoms, and the like are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

The invention claimed is:

1. A method of making an article comprising:
   (1) providing a disperse dyed fabric comprising a melt-spun thermoplastic polyurethane fiber, wherein the fiber comprises the reaction product of (a) a reactive thermoplastic polyurethane composition comprising (i) a polyol component, wherein the polyol component comprises a co-polymer diol derived from caprolactone monomer and a polyether polyol, (ii) a hydroxyl terminated chain extender component, and (iii) a first diisocyanate component; and (b) an isocyanate functional prepolymer crosslinker;
   (2) shredding the fabric;
   (3) thermally treating the shredded fabric to form granules;
   (4) melting and shearing the granules in an extruder to form an article.

2. The method of claim 1, wherein the fabric further comprises a second fiber selected from a thermoplastic polyurethane fiber, polyester fiber, nylon fiber, acrylic fiber, polypropylene fiber, or mixtures thereof.

3. The method of claim 1, wherein the fabric comprises up to 99% polyester fibers.

4. The method of claim 1, wherein the co-polymer comprises the reaction product of caprolactone monomer polyol and poly(tetramethylene ether glycol).

5. The method of claim 4, wherein the co-polymer comprises the reaction product of 50% by weight caprolactone monomer polyol and 50% by weight poly(tetramethylene ether glycol).

6. The method of claim 1, wherein the copolymer has a number average molecular weight of about 2000 Daltons.

7. The method of claim 1, wherein the chain extender component comprises 1,4-bis(β-hydroxyethoxy)benzene.

8. The method of claim 7, wherein the chain extender component further comprises a co-chain extender, optionally wherein the co-chain extender is selected from ethylene glycol, diethylene glycol, propylene glycol, dipropylene glycol, 1,4-butanediol, 1,6-hexanediol, 1,3-butanediol, 1,5-pentanediol, neopen-tylglycol, 1,4-cyclohexanedimethanol, 2,2-bis[4-(2-hydroxyethoxy) phenyl]propane, hexamethylenediol, heptanediol, nonanediol, dodecanediol, 3-methyl- 1,5-pentanediol, ethylenediamine, butanediamine, hexamethylenediamine, hydroxyethyl resorcinol and mixtures thereof.

9. The method of claim 1, wherein the first diisocyanate component comprises an aromatic diisocyanate, optionally comprising 4,4'-diphenylmethane diisocyanate.

10. The method of claim 1, wherein the reactive thermoplastic polyurethane composition contains 50% to 80% by weight of the polyol component, 5% to 25% by weight of the chain extender component, and 15% to 30% by weight of the first diisocyanate component.

11. The method of claim 1, wherein the isocyanate functional prepolymer crosslinking agent comprises the reaction product of: (i) a poly(tetramethylene ether glycol) and a second diisocyanate component; or (ii) neopentyl glycol adipate and a second diisocyanate component.

12. The method of claim 11, wherein the second diisocyanate component comprises an aromatic diisocyanate, 4,4'-methylenebis(phenyl isocyanate), an aliphatic diisocyanate, or dicyclohexylmethane-4,4'-diisocyanate.

13. The method of claim 1, further comprising the steps of providing a second polymer material and adding said second polymer to the extruder with the granules.

14. The method of claim 13, wherein the second polymer is selected from polyester or thermoplastic polyurethane.

15. A method of making an article comprising the steps of:
(1) providing a disperse dyed fabric comprising (i) a first fiber component is a thermoplastic hard yarn having 10% to 200% ultimate elongation measured according to ASTM D2256 and (ii) a second fiber component comprising a melt-spun thermoplastic polyurethane fiber having at least 300% ultimate elongation measured according to ASTM D2731, wherein the first fiber component and the second fiber component are knitted together for form the fabric and wherein the fabric is dyed at a temperature of at least 130° C.;
(2) shredding the fabric;
(3) thermally treating the shredded fabric to form granules; and
(4) melting and shearing the granules in an extruder to form an article.

16. The method of claim 15, wherein the melt-spun thermoplastic polyurethane fiber exhibits hysteresis after 5th load and un-load cycle of
(a) at 100% elongation has hysteresis of less than 30%
(b) at 150% elongation has hysteresis of less than 30%
(c) at 200% elongation has hysteresis of less than 30%
wherein hysteresis is measured according to per ASTM D2731.

17. The method of claim 15, wherein the second fiber component is a melt-spun thermoplastic fiber comprising the reaction product of a polyol component, wherein the polyol component comprises a co-polymer diol derived from caprolactone monomer and poly(tetramethylene ether glycol); a hydroxyl terminated chain extender component; and a first diisocyanate component; and an isocyanate functional prepolymer cross-linking agent.

18. The method of claim 17, wherein the co-polymer diol comprises the reaction product of 50% by weight caprolactone monomer polyol and 50% by weight poly(tetramethylene ether glycol).

19. The method of claim 17, wherein the melt-spun thermoplastic polyurethane fiber has a weight average molecular weight measured by gel permeation chromatography of 300,000 to 450,000.

20. The method of claim 17, wherein the first diisocyanate component comprises an aromatic diisocyanate, optionally comprising 4,4'-diphenylmethane diisocyanate.

21. The method of claim 17, wherein the isocyanate functional prepolymer crosslinking agent comprises er consists of the reaction product of: (i) a poly(tetramethylene ether glycol) and a second diisocyanate component; or (ii) neopentyl glycol adipate and a second diisocyanate component.

22. The method of claim 21, wherein the second diisocyanate component comprises an aromatic diisocyanate, 4,4'-methylenebis(phenyl isocyanate), an aliphatic diisocyanate, or dicyclohexylmethane-4,4'-diisocyanate.

23. The method of claim 15, wherein the first fiber is selected from thermoplastic polyurethane fiber, polyester fiber, nylon fiber, cotton fiber, wool fiber, acrylic fiber, polypropylene fiber, viscose-rayon fiber, or mixtures thereof.

* * * * *